United States Patent
Oh et al.

(10) Patent No.: US 8,169,766 B2
(45) Date of Patent: May 1, 2012

(54) SHAFT CURRENT CONTROL BRUSH RING ASSEMBLY

(75) Inventors: Hieyoung W. Oh, Bowdoin, ME (US); Adam H. Willwerth, North Yarmouth, ME (US)

(73) Assignee: Illinois Tool Works, Inc., Glenview, IL (US)

( * ) Notice: Subject to any disclaimer, the term of this patent is extended or adjusted under 35 U.S.C. 154(b) by 0 days.

(21) Appl. No.: 13/114,994

(22) Filed: May 24, 2011

(65) Prior Publication Data

US 2011/0216466 A1 Sep. 8, 2011

Related U.S. Application Data

(63) Continuation of application No. 11/221,557, filed on Sep. 8, 2005, which is a continuation-in-part of application No. 10/877,112, filed on Jun. 25, 2004, now Pat. No. 7,193,836, and a continuation-in-part of application No. 10/714,295, filed on Nov. 14, 2003, now Pat. No. 7,136,271.

(60) Provisional application No. 60/673,308, filed on Apr. 20, 2005, provisional application No. 60/508,949, filed on Oct. 6, 2003, provisional application No. 60/508,950, filed on Oct. 6, 2003, provisional application No. 60/455,301, filed on Mar. 17, 2003.

(51) Int. Cl.
*H05F 3/00* (2006.01)

(52) U.S. Cl. ........................................................ 361/221

(58) Field of Classification Search ................... 361/221
See application file for complete search history.

(56) References Cited

U.S. PATENT DOCUMENTS

| | | | |
|---|---|---|---|
| 3,873,835 | A | 3/1975 | Ignatjev |
| 4,189,702 | A | 2/1980 | Maloy |
| 4,197,970 | A | 4/1980 | Plumadore |
| 4,281,328 | A | 7/1981 | Shores |
| 4,307,432 | A | 12/1981 | Nishikawa |
| 4,358,699 | A | 11/1982 | Wilsdorf |
| 4,398,113 | A | 8/1983 | Lewis et al. |
| 4,494,166 | A | 1/1985 | Billings et al. |
| 4,515,417 | A | 5/1985 | Shiraishi |
| 4,535,264 | A | 8/1985 | Allport |
| 4,801,270 | A | 1/1989 | Scarlata |
| 4,994,861 | A | 2/1991 | Brandon et al. |
| 5,010,441 | A * | 4/1991 | Fox et al. ....................... 361/221 |

(Continued)

FOREIGN PATENT DOCUMENTS

CN 1504012 6/2004

(Continued)

OTHER PUBLICATIONS

Northrop Grumman Component Technologies, "Fiber Brush Slip Ring Technology for Mission-Critical Aerospace and Military Applications," Poly-Scientific, Copyright 1998.

(Continued)

*Primary Examiner* — Dharti Patel
(74) *Attorney, Agent, or Firm* — Fletcher Yoder P.C.

(57) ABSTRACT

A shaft current control brush ring assembly includes a cup and a brush ring assembly secured within the cup. The cup is secured to a motor faceplate, within a recess formed in the faceplate by interference fit, or by means of a clamp attached to the faceplate. A slinger can be associated with the brush ring assembly.

19 Claims, 2 Drawing Sheets

U.S. PATENT DOCUMENTS

| | | | |
|---|---|---|---|
| 5,085,373 | A | 2/1992 | Behr et al. |
| 5,090,710 | A | 2/1992 | Flower |
| 5,139,862 | A | 8/1992 | Swift et al. |
| 5,227,950 | A | 7/1993 | Twerdochlib |
| 5,251,081 | A | 10/1993 | Cossette et al. |
| 5,270,106 | A | 12/1993 | Orlowski et al. |
| 5,354,607 | A | 10/1994 | Swift et al. |
| 5,400,208 | A | 3/1995 | Pazda et al. |
| 5,474,305 | A * | 12/1995 | Flower .................. 277/355 |
| 5,661,356 | A | 8/1997 | Fisher et al. |
| 5,690,014 | A | 11/1997 | Larkin |
| 5,799,952 | A | 9/1998 | Morrison et al. |
| 5,804,903 | A | 9/1998 | Fisher et al. |
| 5,812,908 | A | 9/1998 | Larocca et al. |
| 5,865,979 | A | 2/1999 | Collins, Jr. et al. |
| 5,988,996 | A | 11/1999 | Brookbank et al. |
| 6,048,119 | A | 4/2000 | Kato et al. |
| 6,071,125 | A | 6/2000 | Shiozawa |
| 6,071,400 | A | 6/2000 | Schroder et al. |
| 6,277,336 | B1 | 8/2001 | Henrich et al. |
| 6,315,475 | B1 | 11/2001 | Carter et al. |
| 6,352,263 | B1 | 3/2002 | Gail et al. |
| 6,498,913 | B1 | 12/2002 | Tooker et al. |
| 6,517,357 | B1 | 2/2003 | Athanasiou et al. |
| 6,561,813 | B2 | 5/2003 | Rutten et al. |
| 6,686,673 | B1 | 2/2004 | Komura et al. |
| 6,844,642 | B2 | 1/2005 | Tashiro |
| 6,896,735 | B2 | 5/2005 | Giuliano et al. |
| 6,909,868 | B2 | 6/2005 | Yamada et al. |
| 6,910,857 | B2 * | 6/2005 | Addis .................. 415/174.2 |
| 7,136,271 | B2 | 11/2006 | Oh et al. |
| 7,193,836 | B2 | 3/2007 | Oh et al. |
| 7,521,827 | B2 | 4/2009 | Orlowski et al. |
| 2002/0121821 | A1 | 9/2002 | Ritter |
| 2003/0052564 | A1 | 3/2003 | Wilsdorf |
| 2003/0086630 | A1 | 5/2003 | Bramel et al. |
| 2004/0135016 | A1 | 7/2004 | Baumann et al. |
| 2006/0007609 | A1 | 1/2006 | Oh et al. |
| 2007/0040459 | A1 | 2/2007 | Oh |
| 2007/0278093 | A1 | 12/2007 | Barnard et al. |
| 2008/0258576 | A1 | 10/2008 | Oh et al. |
| 2010/0252420 | A1 | 10/2010 | Barnard et al. |

FOREIGN PATENT DOCUMENTS

| | | |
|---|---|---|
| EP | 0796663 | 9/1997 |
| EP | 1460885 | 9/2004 |
| EP | 1523086 | 4/2005 |
| JP | 57-52773 | 3/1982 |
| JP | 2168595 | 6/1990 |
| JP | 4368446 | 12/1992 |
| JP | 6036887 | 2/1994 |
| JP | 6199010 | 7/1994 |
| JP | 2004356099 | 12/2004 |
| JP | 2005151749 | 6/2005 |
| WO | 9701200 | 1/1997 |

OTHER PUBLICATIONS

Arora et al., "JTAGG II Brush Seal Test Results," 33rd Joint Propulsion Conference and Exhibit, Jul. 6-9, 1997, pp. 1-15, NASA Technical Memorandum 107448, Seattle, WA.

Furutani et al., "Accretion of titanium carbide by electrical discharge machining with powder suspended in working fluid," Precision Engineering Journal of the International Societies for Precision Engineering and Nanotechnology, 2001, pp. 138-144, Elsevier.

Schiferl et al., "Bearing Current Remediation Options," IEEE Industry Applications Magazine, Jul.-Aug. 2004, pp. 40-50.

Yung, "Wind Generators: Unique Repair Tips," EASA Convention, Jun. 26, 2006, pp. 1-27, Las Vegas, NV.

"Inverter-Driven Induction Motors Shaft and Bearing Current Solutions," Rockwell Automation Industry White Paper, Dodge Reliance Electric.

* cited by examiner

SHAFT CURRENT CONTROL BRUSH RING ASSEMBLY

CROSS-REFERENCE TO RELATED APPLICATIONS

The present application is a continuation of U.S. patent application Ser. No. 11/221,557, entitled "Shaft Current Control Brush Ring Assembly," filed on Sep. 8, 2005, which claims the benefit of U.S. Provisional Patent Application No. 60/673,308, filed on Apr. 20, 2005, and is a continuation-in-part of U.S. patent application Ser. No. 10/877,112, filed on Jun. 25, 2004, which claims the benefit of U.S. Provisional Patent Application No. 60/508,949, filed on Oct. 6, 2003, and U.S. Provisional Patent Application No. 60/508,950, also filed on Oct. 6, 2003, and is a continuation-in-part of U.S. patent application Ser. No. 10/714,295, filed on Nov. 14, 2003, which claims the benefit of U.S. Provisional Patent Application No. 60/455,301, filed on Mar. 17, 2003. Each of the foregoing applications is hereby incorporated by reference in its entirety.

FIELD OF THE INVENTION

The present invention relates to grounding devices for controlling shaft current that is generated in AC variable speed motors or DC motors, generators, and other rotating shafts and, more specifically, to non-contacting grounding devices.

BACKGROUND OF THE INVENTION

Shaft induced electrical current is experienced in electrical motors, and is commonly experienced with three-phase motors driven by variable speed drives. Variable speed drives utilize pulse width modulation technology to vary the speed of AC motors, thereby allowing use of less-expensive AC motors in applications where more expensive DC motors had been used previously. A drawback to the use of AC motors with variable speed drives is that higher common mode voltage (CMV) is generated by the variable speed drive that increases shaft induced currents.

Voltage on the motor shaft induces current flow through the shaft bearings to the motor frame and then to ground. While the motor is running, the bearings become more resistive to current flow, causing a buildup of charge on the shaft surfaces. Over a short period of time, the CMV causes electrical charges to build to a high level. As the electrical charges pass the threshold level of the least electrically resistant path, usually through the ball bearings on the shaft, an instantaneous burst or discharge of electrical energy passes through the bearing. This discharge causes electric discharge machining (EDM), which can damage the surfaces of the bearing races and the balls in the bearing. The electrical energy burst creates fusion craters, and particulate from the crater formation remains inside the sealed bearing. Both the fusion crater and the particulate material in the bearing act to disturb the free flow rotation of the bearing, which can lead to physical damage and premature bearing failure.

A number of mitigation technologies have been used in attempts to overcome this problem. Known attempts include using conductive bearing grease, insulating the bearings and using copper/phosphorus brushes and a Faraday shield. A common, somewhat cost-effective solution that has been used is to ground the shaft using spring-loaded copper brushes that provide a continuous flow of current to ground. Copper brushes, however, wear out quite rapidly and require frequent, periodic service and replacement. Additionally, oxide build-up on the shaft and other barriers between the brushes and the shaft reduce the current flow and cause a burst of electrical energy across the brush and shaft. Spring-loaded brushes also tend to vibrate due to alternating frictional stick/slip relationships between the brush and the shaft surface. Vibration of the brushes, from whatever cause, can result in undesirable sparking.

The aforementioned parent application Ser. No. 10/877,112 discloses a grounding brush for mitigating electrical current on motor shafts including conductive filaments in a holder surrounding the shaft. The brush can be used as a non-contacting ionizer to reduce the amount of electrical charges on the isolated shaft or on an isolated roller.

What is needed in the art is a grounding system that can be used effectively for a prolonged period of time, requiring minimal service or replacement, and that can be installed easily and quickly in the assembly of new motors and as a retrofit for existing motors.

SUMMARY OF THE INVENTION

The present invention provides a grounding brush assembly that can be press-fit into a modified end plate of a motor or can be clamped in place on the shaft of the motor for retrofit applications without modification to the motor end plate.

In one aspect thereof, the present invention provides a shaft current control brush ring assembly for a motor having a faceplate and a shaft. The assembly includes a cup having an outer band, an inner barrier and an outer lip. A brush assembly is disposed in the cup and held between the inner bather and the lip. The brush assembly has an annular inner plate, an annular outer plate and a plurality of filaments secured between the inner plate and the outer plate. The filaments have distal ends extending radially inwardly beyond the inner and outer plates. The cup with the brush assembly therein is disposed around the shaft and secured to the faceplate.

In another aspect thereof, the present invention provides a shaft current control brush ring assembly with a cup having an outer band, an inner bather and an outer lip. A brush assembly is disposed in the cup and held between the inner barrier and the lip. The brush assembly has an annular inner plate, an annular outer plate and a plurality of filaments secured between the inner plate and the outer plate. The filaments have distal ends extending radially inwardly beyond the inner and outer plates.

In still another aspect thereof, the present invention provides an electric motor with a motor faceplate, a motor shaft extending outwardly of the faceplate; and a shaft current control brush ring assembly disposed around the shaft and secured to the faceplate. The shaft current control brush ring assembly includes a cup having an outer band, an inner barrier and an outer lip. A brush assembly is disposed in the cup and held between the inner barrier and the lip. The brush assembly has an annular inner plate, an annular outer plate and a plurality of filaments secured between the inner plate and the outer plate. The filaments have distal ends extending radially inwardly beyond the inner and outer plates. The cup with the brush assembly therein is disposed around the motor shaft and the cup is secured to the motor faceplate.

An advantage of the present invention is providing an effective conductive brush assembly to reduce shaft current on electrical motors.

Another advantage of the present invention is providing a grounding device for electrical motor shafts that functions effectively for a prolonged period of time without service, maintenance or repair.

Still another advantage of the present invention is providing a conductive brush system having improved conductivity therethrough for improved grounding performance of the device through precise, optimal positioning of the components thereof.

A still further advantage of the present invention is providing a grounding device for electrical motors that is readily adapted to motors of different sizes.

Yet another advantage of the present invention is providing a shaft current control brush ring assembly that can be installed quickly and easily in new motors during manufacture or can be retrofit on existing motors without significant modification to the motor.

Other features and advantages of the invention will become apparent to those skilled in the art upon review of the following detailed description, claims and drawings in which like numerals are used to designate like features.

Figure 1:
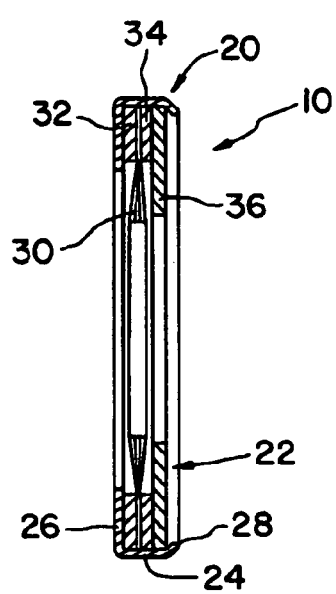
FIG. 1 is a cross-sectional view of a shaft current control brush ring assembly in accordance with the present invention.

Before the embodiments of the invention are explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein are for the purpose of description and should not be regarded as limiting. The use herein of "including", "comprising" and variations thereof is meant to encompass the items listed thereafter and equivalents thereof, as well as additional items and equivalents thereof.

DETAILED DESCRIPTION OF THE PREFERRED EMBODIMENT

Referring now more specifically to the drawings and to FIG. 1 in particular, numeral 10 designates a shaft current control brush ring assembly in accordance with the present invention. Brush ring assembly 10 is installed on a motor 12 (FIG. 2) and specifically in a faceplate 14 of motor 12 for dissipating electrical charges that may build up on a shaft 16 of motor 12. It should be understood that brush ring assembly 10 can be provided in a variety of different sizes for use in motors of different types and on shafts 16 of different diameters.

Brush ring assembly 10 is of generally annular shape, surrounding shaft 16. Brush ring assembly 10 is secured to faceplate 14 and is operatively arranged between shaft 16 and faceplate 14. Brush ring assembly 10 is continuously operative to dissipate electrical charges that build on motor shaft 16 during operation of motor 12 by transferring the charges from shaft 16 to faceplate 14 and the grounding circuit of motor 12.

Brush ring assembly 10 includes an annular cup 20 and a brush assembly 22 disposed therein. Cup 20 includes an outer band 24, an inner barrier 26 and an outer lip 28. Together, outer band 24, inner lip 26 and outer lip 28 form an annular shell or channel-like cup 20 in which brush assembly 22 is disposed. Cup 20 is made of conductive materials and has mechanical properties necessary for mounting the assembly to faceplate 14 as will be described hereinafter. Accordingly, cup 20 can be made of aluminum, stainless steel, bronze, copper or other suitable material.

Brush assembly 22 includes a plurality of individual fiber filaments 30 that may be arranged individually, in a substantially continuous annular ring or in bundles circumferentially around shaft 16. Each filament 30 is a fine, hair-like structure and is made from carbon fibers, stainless steel, conductive plastics such as acrylic or nylon fibers, or any other conductive fiber-type filament that can be provided with diameters sufficiently small to induce ionization when in the presence of an electrical field. Filaments 30 generally have diameters less than about 150 microns. Preferably, filaments 30 have diameters within a range of about 5 microns to about 100 microns.

Figure 3:
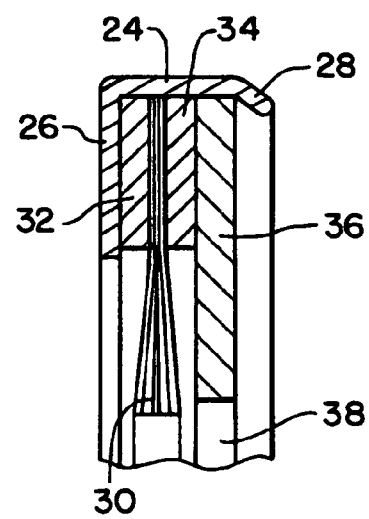
FIG. 3 is an enlarged cross-sectional view of a portion of the shaft current control brush ring assembly shown in FIG. 1.

With reference to the enlarged, fragmentary view of FIG. 3, filaments 30, or bundles thereof, are held between an annular inner plate 32 and an annular outer plate 34. Distal end portions of filaments 30 extend past the inner diameters of annular inner plate 32 and annular outer plate 34. Filaments 30 or bundles thereof can be secured to inner plate 32 and outer plate 34 by conductive adhesive, adhesive tape or other suitable means (not shown). Alternatively, filaments 30 can be placed directly against the confronting surfaces of inner plate 32 and outer plate 34 and held therein in a press-fit arrangement in cup 20, with lip 28 hold brush assembly 22 against inner barrier 26.

Inner plate 32 and outer plate 34 are made of conductive materials for the transfer of electrical charge from filaments 30 to cup 20, and can be made of aluminum, stainless steel, bronze, copper or other suitable material. An annular shield 36 is provided on the outer side of outer plate 34 and has a central opening of smaller diameter than inner plate 32 and outer plate 34, and only slightly larger than the diameter of shaft 16. Accordingly, shield 36 covers and protects filaments 30 but is in spaced relation thereto, being separated and spaced from filaments 30 by the thickness of outer plate 34. Shield 36 is spaced minimally from shaft 16 so that only a small gap 38 remains between shield 36 and shaft 16, to inhibit ingress of contaminants to brush assembly 22.

Figure 2:
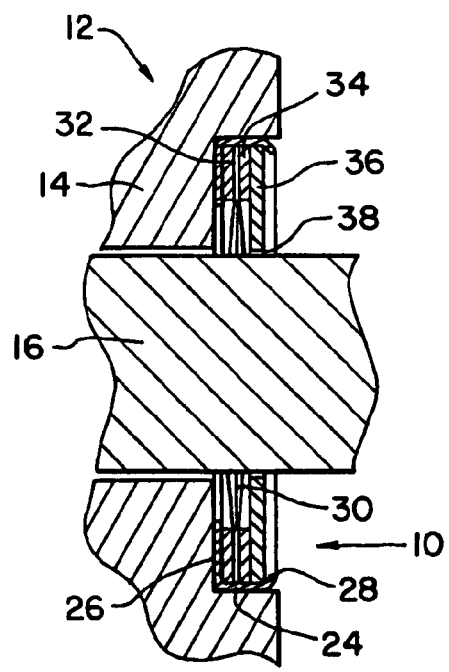
FIG. 2 is a cross-sectional view of a shaft current control brush ring assembly mounted in a machined bore in the faceplate of an electric motor.

FIG. 2 illustrates the manner in which brush ring assembly 10 is installed in faceplate 14. Specifically, faceplate 14 includes a precisely machined recess 40 therein of appropriate diameter to receive cup 20 in a press-fit arrangement. Brush assembly 22 is installed in cup 20, with lip 28 folded inwardly to compress the assembly of brush assembly 22 within cup 20. The completed assembly of brush ring assembly 10 is pressed into recess 40 and held therein by an interference fit relationship. Lip 28 is angularly oriented, and can be slightly outward of the outer surface of faceplate 14 as well as outer plate 34, to direct contaminants away from brush assembly 22. Any fluids or debris cascading down faceplate 14 are diverted outwardly by lip 28. Precise machining of recess 40 facilitates accurate, optimal positioning of filaments 30 relative to shaft 16 for optimal performance of shaft current control brush ring assembly 10. Cup 20 can be tapered or chamfered at the junction of inner bather 26 and outer bather 24 to facilitate insertion of cup 20 into recess 40.

When installed, filaments 30 can be in direct contact with shaft 16 as a grounding brush, for direct transfer of electrical charge from shaft 16 to brush ring assembly 10. Alternatively, filaments 30 can be minimally spaced from shaft 16 such that, as an electrical field is generated by charges building on shaft 16, an ionized field is created, allowing indirect transfer of charges from shaft 16 to filaments 30. In still another suitable arrangement, the fine, lightweight filaments 30 are in contact with shaft 16 when motor 10 is at rest or is operating at slow speeds. As the speed of shaft 16 increases during startup and use, air currents move filaments 30 away from shaft 16. Eliminating or reducing the time period of frictional contact between filaments 30 and shaft 16 reduces wear and prolongs the life of filaments 30. Faceplate 14 is electrically connected to ground, and charges building on shaft 16 are dissipated to ground through brush ring assembly 10 before arcing can occur.

Figure 4:
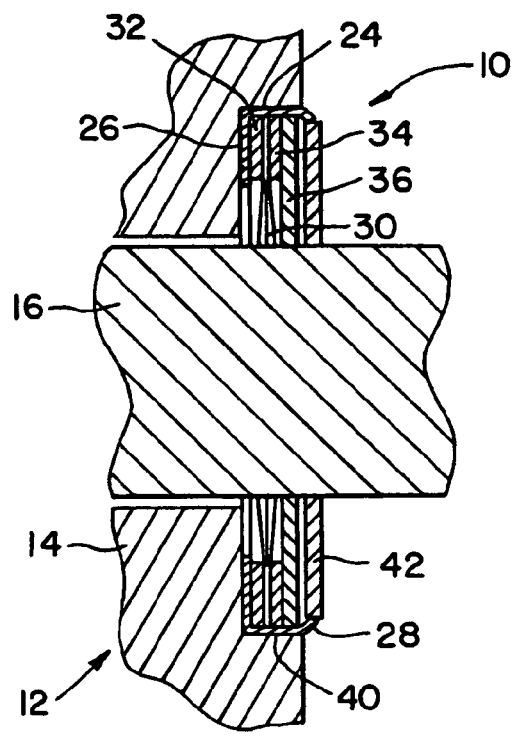
FIG. 4 is a cross-sectional view of a shaft current control brush ring assembly in accordance with the present invention for use with a motor having an annular slinger.

FIG. 4 illustrates a further embodiment of the present invention in which a slinger 42 is provided at the outer lip of cup 20. Slinger 42 is of conventional design, well known to those skilled in the art. Slinger 42 is mounted on shaft 16 for rotation therewith. Debris or fluids contacting sling 42 are propelled outwardly and away from brush assembly 22 by the centrifugal action of the rotating slinger. Any fluids or debris cascading down faceplate 14 are diverted by lip 28 to the outer surface of slinger 42, to be driven away as described above.

Figure 5:
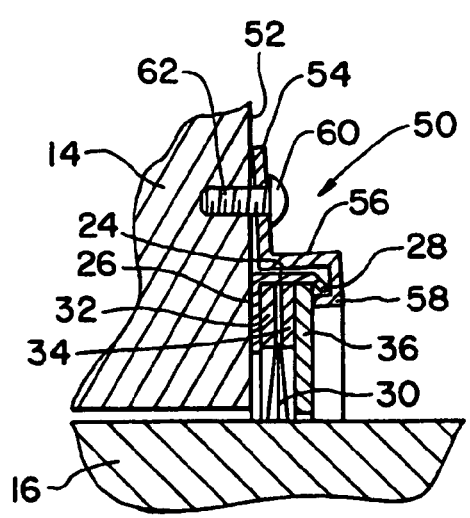
FIG. 5 is a fragmentary cross-sectional view of a shaft current control brush ring assembly in accordance with the present invention illustrating an attachment system utilizing a clamp to retrofit the ring assembly on a motor.

FIG. 5 illustrates yet another embodiment of the present invention in which a plurality of clamps 50 hold shaft current control brush ring assembly 10 in operating position on faceplate 14. While only one clamp 50 is shown, it should be understood that several clamps 50 positioned around assembly 10 can be used. Shaft current control brush ring assembly 10 is placed against an outer surface 52 of faceplate 14 for installation. Clamps 50 include a base 54 against outer surface 52 and a riser 56 substantially perpendicular to base 54 and extending along side outer band 24. An annular hooked end 58 overlaps and engages outer lip 28. Hooked end 58 is engaged against shield 36 and lip 28 to hold brush ring assembly 10 firmly against faceplate 14. Fasteners 60 in the nature of screws or bolts are received in holes 62 provided in faceplate 14. Clamps 50 can be of a spring-like design to forcibly hold brush ring assembly 10 against faceplate 14. It should be understood that while a plurality of clamps 50 can be used, a clamping ring of annular design also can be used. In an annular design the individual components need not be annular to extend completely around brush ring assembly 10 uninterrupted. One or more of base 54, riser 56 and hooked end 58 can be provided as multiple segments or continuously annular. For example, a plurality of individual riser segments can be used between an annular base 54 and an annular hooked end 58, or with a segmented base or a segmented hooked end. An annular riser 56 can be used with a segmented base and/or a segmented hooked end.

Using clamps 50, or one of the variations thereof as described above, ring assembly 10 can be retrofit on a motor quickly and easily without modification of the motor except for drilling appropriate holes 62 for receiving fasteners 60. Retrofit is easy and quick.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

The invention claimed is:

1. A shaft current control brush ring assembly comprising: two electrically conductive annular structures; and
a plurality of electrically conductive filaments retained by the two electrically conductive annular structures via compression of the plurality of electrically conductive filaments between the two electrically conductive annular structures, wherein the plurality of electrically conductive filaments is arranged circumferentially around the two electrically conductive annular structures and extending radially inward.

2. The shaft current control brush ring assembly of claim 1, wherein each electrically conductive filament is sufficiently small to induce ionization in the presence of an electric field.

3. The shaft current control brush ring assembly of claim 2, wherein the plurality of electrically conductive filaments extends radially inward toward a shaft, the plurality of electrically conductive filaments is configured to be spaced from the shaft by a gap, and an electrical charge is transferred indirectly from the shaft to the two electrically conductive annular structures via an electrical field across the gap.

4. The shaft current control brush ring assembly of claim 1, wherein the plurality of electrically conductive filaments extends radially inward toward a shaft, and the plurality of electrically conductive filaments is configured to transfer an electrical charge from the shaft to the two electrically conductive annular structures via direct contact with the shaft.

5. The shaft current control brush ring assembly of claim 1, wherein at least one of the plurality of electrically conductive filaments is made from a material comprising carbon fiber.

6. The shaft current control brush ring assembly of claim 1, comprising a clamp configured to secure the two electrically conductive annular structures to an outer surface of a faceplate.

7. The shaft current control brush ring assembly of claim 6, wherein the clamp comprises a base configured to mount to the outer surface of the faceplate, a riser projecting outwardly from the base, and a distal end projecting outwardly from the riser along an axial surface of one electrically conductive annular structure.

8. The shaft current control brush ring assembly of claim 7, comprising a fastener configured to pass through an opening in the base to secure the clamp to the outer surface of the faceplate.

9. The shaft current control brush ring assembly of claim 1, wherein at least one of the plurality of electrically conductive filaments comprises a diameter of less than approximately 150 microns.

10. The shaft current control brush ring assembly of claim 1, wherein each electrically conductive annular structure is made of a material comprising at least one of aluminum, stainless steel, bronze, or copper.

11. A shaft current control brush ring assembly comprising:
an electrically conductive annular housing having a base member and an outer band extending about a perimeter of the base member;
a plurality of electrically conductive filaments arranged circumferentially around the electrically conductive annular housing and extending radially inward, wherein each electrically conductive filament is sufficiently small to induce ionization in the presence of an electric field; and at least one electrically conductive annular plate secured to the electrically conductive annular housing, wherein the electrically conductive annular housing is configured to retain the plurality of electrically conductive filaments by compressing the plurality of electrically conductive filaments against the at least one electrically conductive annular plate.

12. The shaft current control brush ring assembly of claim 11, wherein the plurality of electrically conductive filaments extends radially inward toward a shaft, the plurality of electrically conductive filaments is configured to be spaced from the shaft by a gap, and an electrical charge is transferred indirectly from the shaft to the electrically conductive annular housing via an electrical field across the gap.

13. The shaft current control brush ring assembly of claim 11, comprising a clamp configured to secure the electrically conductive annular housing to an outer surface of a faceplate.

14. The shaft current control brush ring assembly of claim 11, wherein at least one of the plurality of electrically conductive filaments comprises a diameter of approximately between 5 to 100 microns.

15. The shaft current control brush ring assembly of claim 11, wherein at least one of the plurality of electrically conductive filaments is made from a material comprising carbon fiber.

16. A shaft current control brush ring assembly comprising:
   an electrically conductive annular housing having a base member and an outer band extending about a perimeter of the base member;
   a brush assembly disposed within the annular housing, wherein the brush assembly comprises a plurality of electrically conductive filaments each being sufficiently small to induce ionization in the presence of an electric field, and wherein the brush assembly is configured to transfer an electrical charge to the electrically conductive annular housing through at least one of the plurality of electrically conductive filaments; and
   a clamp configured to secure the electrically conductive annular housing to an outer surface of a faceplate, wherein the clamp comprises a base configured to mount to the outer surface of the faceplate, a riser projecting outwardly from the base along a radial surface of the outer band, and a distal end projecting outwardly from the riser along an axial surface of the outer band.

17. The shaft current control brush ring assembly of claim 16, comprising a fastener configured to pass through an opening in the base to secure the clamp to the outer surface of the faceplate.

18. The shaft current control brush ring assembly of claim 16, comprising at least one electrically conductive annular plate secured to the electrically conductive annular housing, wherein the electrically conductive annular housing is configured to retain the plurality of electrically conductive filaments by compressing the plurality of electrically conductive filaments against the at least one electrically conductive annular plate.

19. The shaft current control brush ring assembly of claim 16, wherein the plurality of electrically conductive filaments extends radially inward toward a shaft, the plurality of electrically conductive filaments is configured to be spaced from the shaft by a gap, and the electrical charge is transferred indirectly from the shaft to the electrically conductive annular housing via an electrical field across the gap.

* * * * *